(12) United States Patent
Schwarz et al.

(10) Patent No.: US 8,782,304 B2
(45) Date of Patent: *Jul. 15, 2014

(54) METHOD FOR ENABLING SEVERAL VIRTUAL PROCESSING UNITS TO DIRECTLY AND CONCURRENTLY ACCESS A PERIPHERAL UNIT

(75) Inventors: Christian Schwarz, Rousset (FR); Joel Porquet, Aix en Provence (FR)

(73) Assignee: STMicroelectronics Rousset SAS, Rousset (FR)

( * ) Notice: Subject to any disclaimer, the term of this patent is extended or adjusted under 35 U.S.C. 154(b) by 204 days.

This patent is subject to a terminal disclaimer.

(21) Appl. No.: 13/470,007

(22) Filed: May 11, 2012

(65) Prior Publication Data

US 2012/0226834 A1  Sep. 6, 2012

Related U.S. Application Data

(62) Division of application No. 12/606,379, filed on Oct. 27, 2009, now Pat. No. 8,209,449.

(30) Foreign Application Priority Data

Dec. 24, 2008 (FR) ...................................... 08 07430

(51) Int. Cl.
*G06F 3/00* (2006.01)
(52) U.S. Cl.
USPC ................... 710/39; 710/38; 710/40; 710/41; 711/103; 711/114
(58) Field of Classification Search
None
See application file for complete search history.

(56) References Cited

U.S. PATENT DOCUMENTS

| 4,809,165 | A | 2/1989 | Morinaga |
| 5,377,352 | A | 12/1994 | Tanaka et al. |
| 7,594,089 | B2 * | 9/2009 | Vishin et al. ................... 711/168 |
| 2009/0193177 | A1 | 7/2009 | Thekkath |

FOREIGN PATENT DOCUMENTS

EP   0 969 367 A2   1/2000

OTHER PUBLICATIONS

Multithreading review—the outcomes. Words, words, words, pp. 1-8, printed from http://ukwww.mips.com/mt/minutes.html, date appears to be Sep. 14, 2005.*

* cited by examiner

*Primary Examiner* — Tammara Peyton
(74) *Attorney, Agent, or Firm* — Seed IP Law Group PLLC

(57) ABSTRACT

The present disclosure relates to a method for enabling a virtual processing unit to access a peripheral unit, the virtual processing unit being implemented by a physical processing unit connected to the peripheral unit, the method comprising a step of transmitting to the peripheral unit a request sent by the virtual processing unit to access a service provided by the peripheral unit, the access request comprising at least one parameter and an identifier of the virtual unit, the method comprising steps, executed by the peripheral unit after receiving an access request, of allocating a set of registers to the virtual unit identifier received, storing the parameter received in the register set allocated, and when the peripheral unit is available for processing a request, selecting one of the register sets, and triggering a process in the peripheral unit from the parameters stored in the selected register set.

13 Claims, 5 Drawing Sheets

METHOD FOR ENABLING SEVERAL VIRTUAL PROCESSING UNITS TO DIRECTLY AND CONCURRENTLY ACCESS A PERIPHERAL UNIT

BACKGROUND

1. Technical Field

The present disclosure relates to data processing systems, and particularly systems which can simultaneously or time-share execute several applications, embedded systems and systems integrated onto a chip. The present disclosure also relates to systems having one or more central processing units linked to one or more peripheral units, and the access to the peripheral units.

2. Description of the Related Art

FIG. 1 schematically represents the architecture of a data processing system PS1. The system PS1 comprises a physical central processing unit CPU, and a peripheral unit PRP1 connected to the unit CPU, by means of an address and data bus for example. The peripheral unit PRP1 may for example be a unit for interfacing with external memories, an input/output port, for example of USB (Universal Serial Bus) or UART (Universal Asynchronous Receiver Transmitter) type, or even a DMA (Direct Memory Access) control unit.

The unit CPU can time-share execute several independent applications or operating systems CP1, CP2, CP3, CP4, referred to below as "virtual processing unit". Generally, a "virtual processing unit" means a software component capable of working in a native and autonomous manner on one or more processors. The unit CPU executes a trust agent TA1 which acts as a "hypervisor" to enable the execution of several virtual units or sessions, for example in a virtualization context. The agent TA1 thus manages the activation and the deactivation of the virtual units, for example depending on their priority levels and rights to access the resources of the system.

The peripheral unit PRP1 comprises a control interface PINT comprising one or more input and/or output and/or input/output registers RG1-RG4, and a peripheral processing unit PRE. The interface PINT is accessible via an access point EP corresponding to one or more addresses of the space addressable by the unit CPU.

The registers RG1-RG4 can each have an address of the addressable space. Thus, the units CP1-CP4 can selectively read and/or write-access each of the registers RG1-RG4.

BRIEF SUMMARY

An embodiment comprises a peripheral unit which is simultaneously accessible to several physical and/or virtual processing units, without it being necessary to rely on additional software components executed by the physical processing units. In an embodiment, a peripheral unit is accessible via a unique entry point, while enabling several virtual processing units to simultaneously configure the control interface of the peripheral unit.

In one embodiment, a method for enabling a virtual processing unit to access a peripheral unit is provided, the virtual processing unit being implemented by a physical processing unit connected to the peripheral unit and executing several virtual processing units, the method comprising a step of transmitting to the peripheral unit an access request sent by the virtual processing unit to access a service provided by the peripheral unit, the access request comprising at least one parameter. According to one embodiment, the access request comprises an identifier of the virtual processing unit, the method comprising steps executed by the peripheral unit, after receiving an access request, of allocating a set of at least one register to the virtual unit identifier transmitted in the access request received, storing the parameter transmitted in the access request in the register set allocated to the virtual unit identifier transmitted in the access request received, and when the peripheral unit is available for processing a request, selecting one of the register sets, and triggering a service execution process in the peripheral unit from the parameters stored in the selected register set.

According to one embodiment, the selection of one of the register sets is performed from the register sets meeting a condition for triggering a process in the peripheral unit.

According to one embodiment, the method comprises a step of storing in the selected register set parameters generated during the service execution process in the peripheral unit.

According to one embodiment, the method comprises a step of transmitting parameters stored in the selected register set to the virtual unit to which the selected register set has been allocated.

According to one embodiment, the method comprises steps of storing in each register set allocated to a virtual unit parameters defining a current state of a finite state machine, loading into the state machine the parameters defining a state machine current state stored in the selected register set, activating the state machine to determine parameters defining a next state of the state machine, and storing the parameters obtained in the selected register set, so as to define a new current state of the state machine.

In one embodiment, a peripheral unit is also provided which provides a service to virtual processing units implemented by a physical processing unit connected to the peripheral unit and executing several virtual processing units, the peripheral unit being configured to receive access requests sent by the virtual processing units to access a service provided by the peripheral unit, each access request comprising at least one parameter. According to one embodiment, each access request comprises an identifier of the virtual processing unit having sent the request, the peripheral unit comprising several register sets each comprising at least one register for storing a parameter transmitted in an access request received, the peripheral unit being configured for, after receiving an access request, allocating one of the register sets to the virtual unit identifier transmitted in the access request received, storing the parameter transmitted in the access request received in the register set allocated to the virtual unit identifier transmitted in the access request received, and when the peripheral unit is available for processing a request, selecting one of the register sets, and triggering a service execution process in the peripheral unit from the parameters stored in the selected register set.

According to one embodiment, the peripheral unit is configured for selecting one of the register sets from the register sets meeting a condition for triggering a process in the peripheral unit.

According to one embodiment, the peripheral unit is configured for storing in the selected register set parameters generated during the service execution process in the peripheral unit.

According to one embodiment, the peripheral unit is configured for transmitting parameters stored in the selected register set to the virtual unit to which the selected register set has been allocated.

According to one embodiment, the peripheral unit is configured for storing in each register set allocated to a virtual unit parameters defining a current state of a finite state machine, loading into the state machine the parameters defining a state machine current state stored in the selected register set, activating the state machine to determine parameters defining a next state of the state machine, and storing the parameters obtained in the selected register set so as to define a new current state of the state machine.

In one embodiment, a data processing system is also provided comprising a physical processing unit executing several virtual processing units, and a peripheral unit connected to the physical processing unit. According to one embodiment, the peripheral unit is as defined above.

According to one embodiment, the system comprises several physical processing units each executing one or more virtual processing units, each physical processing unit being connected to the peripheral unit by a common access point.

In one embodiment, a method for enabling a virtual processing unit to access a peripheral unit, the virtual processing unit being implemented by a physical processing unit connected to the peripheral unit and capable of executing a plurality of virtual processing units, comprises: transmitting to the peripheral unit an access request sent by the virtual processing unit to access a service provided by the peripheral unit, the access request comprising at least one parameter and an identifier of the virtual processing unit; in response to the access request, allocating, under control of the peripheral unit, a set of at least one register to the virtual unit identifier transmitted in the access request received; storing, under control of the peripheral unit, the at least one parameter transmitted in the access request in the register set allocated to the virtual unit identifier transmitted in the access request received; and when the peripheral unit is available for processing a request, selecting, under control of the peripheral unit, one of the register sets, and triggering a service execution process in the peripheral unit from at least one parameter stored in the selected register set. In one embodiment, the selection of one of the register sets is performed from register sets meeting a condition for triggering a process in the peripheral unit. In one embodiment, the method further comprises storing in the selected register set parameters generated during the service execution process in the peripheral unit. In one embodiment, the method further comprises transmitting parameters stored in the selected register set to a virtual unit to which the selected register set has been allocated. In one embodiment, the method further comprises: storing in a register set allocated to a virtual unit parameters defining a current state of a finite state machine; loading into the state machine the parameters defining a state machine current state stored in the selected register set; activating the state machine to determine parameters defining a next state of the state machine; and storing the parameters obtained in the selected register set so as to define a new current state of the state machine.

In an embodiment, a peripheral unit to service virtual processing units implemented by a physical processing unit connected to the peripheral unit and configured to execute a plurality of virtual processing units, the peripheral unit being configured to receive access requests sent by the virtual processing units to access a service provided by the peripheral unit, each access request comprising at least one parameter and an identifier of the virtual processing unit having sent the request, the peripheral unit comprising a plurality of register sets each comprising at least one register for storing parameters transmitted in an access request received, the peripheral unit configured to, after receiving an access request: allocate at least one of the register sets to the virtual unit identifier transmitted in the access request received; store the parameter transmitted in the access request received in the at least one register sets allocated to the virtual unit identifier transmitted in the access request received; and when the peripheral unit is available for processing a request, select one of the register sets of the plurality, and trigger a service execution process in the peripheral unit from the parameters stored in the selected register set. In an embodiment, the peripheral unit is further configured to select one of the register sets from the register sets meeting a condition for triggering a process in the peripheral unit. In an embodiment, the peripheral unit is further configured to store in the selected register set parameters generated during the triggered service execution process in the peripheral unit. In an embodiment, the peripheral unit is further configured to transmit parameters stored in the selected register set to the virtual unit to which the selected register set has been allocated. In an embodiment, the peripheral unit further comprises a finite state machine and is further configured to: store in each register set allocated to a virtual unit parameters defining a current state of the finite state machine; load into the state machine the parameters defining a state machine current state stored in the selected register set; activate the state machine to determine parameters defining a next state of the state machine; and store the parameters obtained in the selected register set so as to define a new current state of the state machine.

In an embodiment, a system comprises: a processing system configured to execute virtual processing sessions; and a peripheral unit including: a plurality of sets of data registers, each set having at least one data register, the peripheral unit being configured, in response to a service request received from a virtual processing session, to allocate a set of registers in the plurality of sets of registers to the received service request and to store a least one parameter and a session ID associated with the received service request in the set of registers allocated to the received service request; an arbitrator configured to select a set of registers of the plurality of sets of registers; and a service module configured to service a service request to which the selected set of registers is allocated. In an embodiment, the processing system comprises a plurality of physical processors each configured to execute a plurality of virtual processing sessions. In an embodiment, the peripheral unit further comprises a finite state machine and the peripheral unit is configured to maintain in the set of registers allocated to the received service request a state of the finite state machine.

In an embodiment, a peripheral unit comprises: a plurality of sets of data registers, each set having at least one data register, the peripheral unit configured to respond to a service request received from a virtual processing session by allocating a set of registers in the plurality of sets of registers to the received service request and to store a least one parameter and a session ID associated with the received service request in the set of registers allocated to the received service request; and at least one processor, wherein the at least one processor is configured to implement: an arbitrator configured to select a set of registers of the plurality of sets of registers; and a service module configured to service a service request to which the selected set of registers is allocated. In an embodiment, the service module comprises a finite state machine implemented by the at least one processor and the peripheral unit is configured to maintain in the set of registers allocated to the received service request a state of the finite state machine.

In an embodiment, a tangible computer-readable medium's contents cause a peripheral device to perform a method of servicing service requests from virtual processing sessions, the service requests including at least one parameter and an identifier of an associated virtual processing session, the method comprising: allocating a set of at least one register in the peripheral device to each virtual processing session from which a service request is received; storing the at least one parameter in the register set allocated to the associated virtual processing session; selecting register sets for servicing; and triggering a service execution process in the peripheral device based on the a least one parameter stored in a corresponding selected register set. In an embodiment, the selecting register sets includes determining whether a register set meets a condition for triggering a process in the peripheral device. In an embodiment, the method further comprises storing in selected register sets parameters generated during the corresponding service execution process in the peripheral device. In an embodiment, the method further comprises transmitting parameters stored in the selected register set in response to the service request. In an embodiment, the service execution process includes maintaining a state machine associated with the selected register set. In an embodiment, maintaining the state machine comprises storing at least one state machine parameter in the associated selected register set.

In an embodiment a system comprises: means for executing a plurality of virtual processing sessions; and a peripheral device including: means for allocating peripheral device memory to respective virtual processing session service requests; means for selecting service requests for servicing; and means for servicing selected service requests. In an embodiment, the means for servicing selected service requests includes means for maintaining a state machine.

BRIEF DESCRIPTION OF THE SEVERAL VIEWS OF THE DRAWINGS

Examples of embodiments will be described below, in relation with, but not limited to, the accompanying figures, in which.

DETAILED DESCRIPTION

In the description that follows, various specific details are given for a better understanding of embodiments of the disclosure. The embodiments described may be implemented without one or several of these details, or by using other methods, equipment, materials, etc. In certain cases, materials or operations that are in and of themselves well known are not described in detail in order to not obfuscate certain aspects of the described embodiments. The reference to an "embodiment" in the descriptions signifies that a characteristic or a particular structure described in relation with this embodiment is included in this embodiment. Thus, the utilization of expressions "in one embodiment" or "according to one embodiment" in various parts of the description are not necessarily referring to the same embodiment. Moreover, the particular characteristics relative to each embodiment may be combined in an appropriate manner to form one or more other embodiments.

Figure 1:
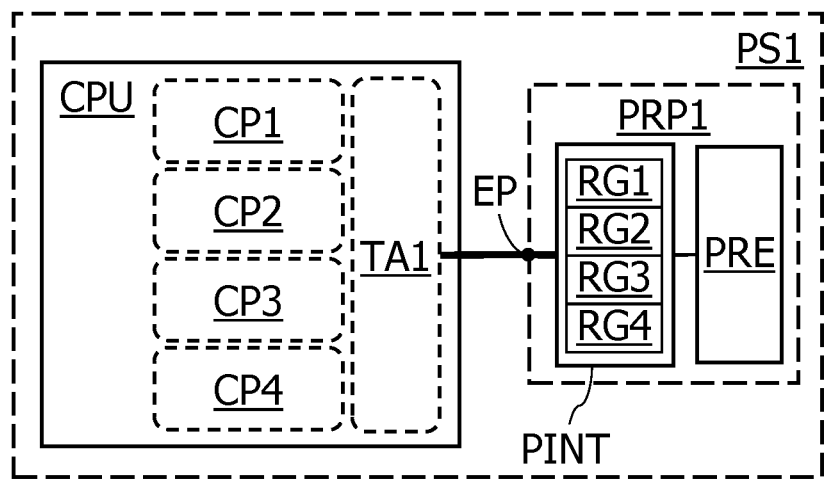
FIG. 1 described above schematically represents an architecture of a data processing system.

Referring to the processing system PS1 of FIG. 1, an arbitrator [not shown] between the processing units CP1-CP4 and the peripheral unit PRP1, implemented by the agent TA1 for example, may be provided to manage access requests that are possibly concurrent sent by the units CP1-CP4 and intended for the peripheral unit PRP1, and to allocate the resources of the peripheral unit to the virtual units. The arbitrator can thus be a driver, executable by the unit CPU. The presence of the arbitrator between the processing units CP1-CP4 and the peripheral unit PRP1 penalizes the performances of the system compared with a system in which the processing units would have a direct access to the peripheral unit. The arbitrator is also an additional element impacting the security of the system and does not necessarily belong to a trust domain. This disadvantage may be unacceptable in a system that must offer a high level of security.

In the example of FIG. 1, replacing the arbitrator by a reservation mechanism for reserving in the interface PINT of the unit PRP1 has been proposed. This mechanism enables a virtual unit CP1-CP4 to reserve the access to the unit PRP1 after receiving a first access request. The mechanism involves for example activating an indicator in the interface PINT until the peripheral unit has provided the service requested. As long as such indicator is activated, the other virtual units cannot access the unit PRP1. If the execution of the virtual unit having reserved the unit PRP1 is stopped for any reason, the peripheral unit remains inaccessible to the other virtual units. This mechanism is therefore vulnerable to failures of the virtual units and to virtual units provided malevolently to block the access to a peripheral unit, even if a time-out has been provided to unblock the access to the peripheral unit at the end thereof.

Some peripheral units comprise a Finite State Machine controlling the sequence of processes triggered after receiving an access request for accessing the peripheral unit sent by a virtual unit. As long as the state machine is processing an access request, the peripheral unit remains unavailable to the other virtual units, even if the state machine is in a state awaiting an action from the virtual unit served by the peripheral unit. Here again, the result is that a faulty or malevolently provided virtual unit can block the access to a peripheral unit.

Figure 2:
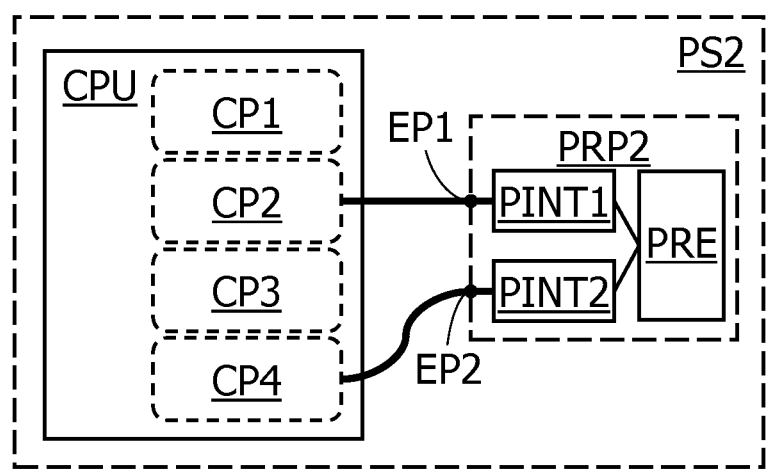
FIG. 2 described above schematically represents another architecture of a data processing system.

FIG. 2 represents another architecture of a data processing system PS2. The system PS2 differs from the system PS1 in that the peripheral unit PRP2 comprises several control interfaces PINT1, PINT2 each accessible to the unit CPU via a respective entry point EP1, EP2. Each entry point EP1, EP2 corresponds to a distinct set of one or more addresses of the addressable space. This architecture thus enables several virtual units to simultaneously access the peripheral unit PRP2 which successively processes the requests supplied in the interfaces PINT1, PINT2.

To avoid having to provide an arbitrator in the unit CPU, the peripheral unit PRP2 has as many interfaces PINT1, PINT2 as virtual processing units CP1-CP4 (CP2 and CP4 in the example of FIG. 2) likely to have access to the peripheral unit PRP2 and to allocate a control interface to each of these virtual processing units CP2-CP4. This architecture thus offers a limited capacity in terms of the number of virtual processing units that can have access to the peripheral unit PRP2. This architecture also has the disadvantage of increasing the occupancy of the addressable space of the unit CPU by the peripheral unit PRP2.

Figure 3:
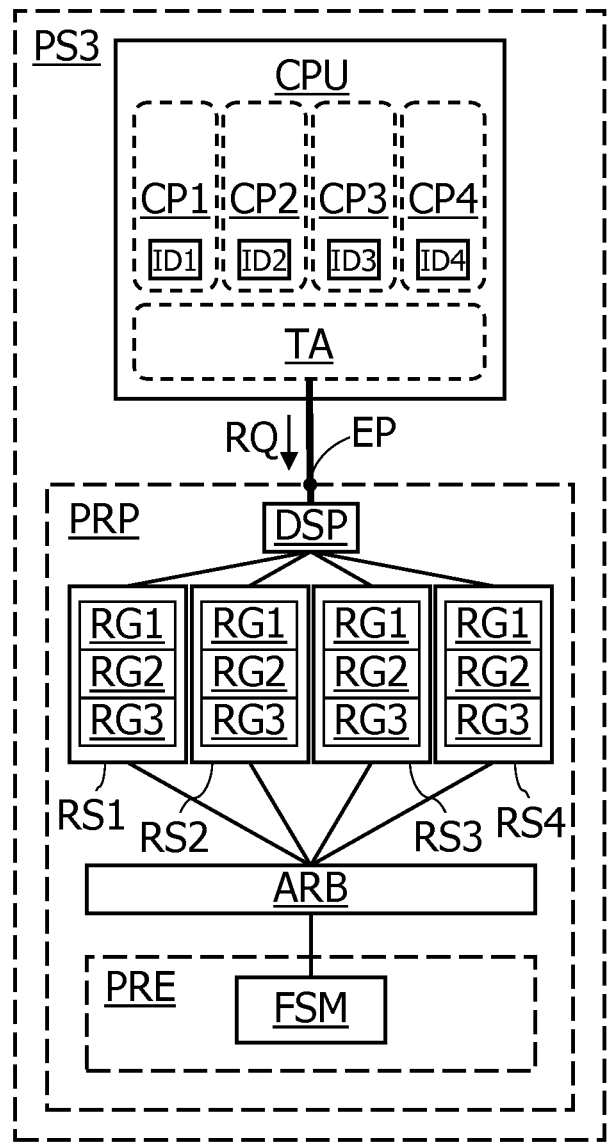
FIG. 3 schematically represents an architecture of a data processing system, according to one embodiment.

FIG. 3 represents the architecture of a data processing system PS3 according to one embodiment. In FIG. 3, the system PS3 comprises a physical central processing unit CPU and a peripheral unit PRP connected to the unit CPU. The peripheral unit PRP can for example be an interface unit for interfacing with external memories, an input/output port, for example of USB or UART type, or even a DMA (Direct Memory Access) control unit.

The unit CPU can time-share execute several virtual processing units CP1, CP2, CP3, CP4. To do so, the unit CPU may execute a trust agent TA which acts as a "hypervisor" to enable the execution of several virtual units, in a virtualization context for example. The agent TA thus manages the activation and the deactivation of the virtual units, for example depending on their priority levels and rights to access the resources of the system.

Figure 6:
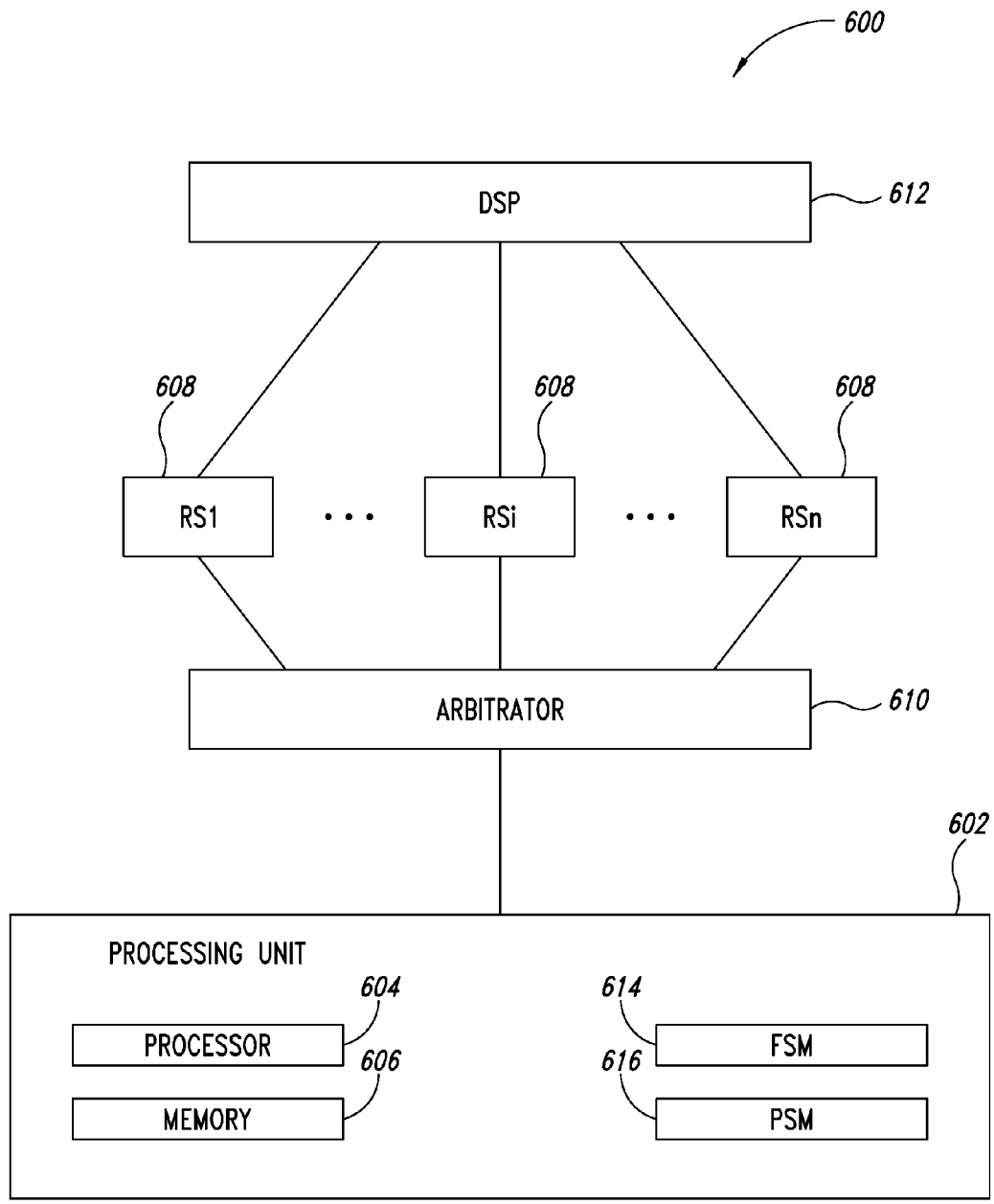
FIG. 6 illustrates a peripheral device according to one embodiment.

According to one embodiment, the unit PRP comprises several identical sets of one or more registers RS1-RS4, a switch unit DSP, a peripheral processing unit PRE and an arbitration unit ARB. Each register set RS1-RS4 comprises one or more input and/or output and/or input/output registers RG1-RG3. The switch unit DSP is connected to the register sets RS1-RS4 and to an access point EP of the unit PRP, which may be a unique access point. The unit DSP is configured to transfer access requests transmitted to the unit PRP in a selected one of the register sets RS1-RS4. As discussed in more detail below, the selected register set may be pre-selected or dynamically selected. The access point EP corresponds to one or more addresses of the space addressable by the unit CPU. Each address of the access point EP enables the unit CPU to access one of the registers RG1-RG3 of a register set RS1-RS4 first selected by the unit DSP. The arbitration unit ARB puts one of the register sets RS1-RS4 first selected into communication with the unit PRE. The peripheral processing unit PRE provides the service or services offered by the unit PRP depending on the content of one of the sets RS1-RS4 first selected by the unit ARB. As shown in FIG. 6, the PRE may comprise a processor 604 and a memory 606.

The virtual processing units CP1-CP4 can send access requests RQ to access one or more services provided by the peripheral unit PRP. The access requests are transmitted with an identifier ID1-ID4 of the virtual unit having sent the request. Each request RQ can comprise one or more parameters relating to the execution of a service by the unit PRP. The unit DSP receives the access requests RQ, selects a register set RS1-RS4, and transfers the parameter or parameters of the request received into the registers RG1-RG3 of the selected register set. A register set may be selected, for example, based on virtual unit identifier ID1-ID4. One register set is thus allocated to each unit CP1-CP4 needing to access the services of the peripheral unit. This allocation can be done in a static way, for example during a phase of configuring the system PS3, or in a dynamic way by the unit DSP as and when access requests RQ sent by the virtual units are received. One virtual unit does not prevent another virtual unit from accessing the peripheral unit, even if the access to the peripheral unit has only a unique entry point.

When the processing unit PRE of the unit PRP is available, for example upon completion of the provision of a service, the unit ARB selects one of the register sets RS1-RS4, i.e., a request to be processed, and transmits to or gives the unit PRE access to the parameters it contains. The unit PRE is then activated to provide a service corresponding to the request to be processed. The selection of one of the register sets is performed from those whose content meets a condition for triggering an operation in the unit PRE. If, at a given time, several register sets meet a condition for triggering an operation in the unit PRE, the unit ARB may select a register set, for example by means of a selection algorithm. For example, the selected register set can be the most formerly modified one after receiving a request received from a virtual unit CP1-CP4. A priority level can be associated with the access requests. In that case, the unit ARB can also select out of the register sets that are in condition to trigger an operation, the one associated with the highest priority level.

The activation of the processing unit PRE can thus be put under the control of the arbitrator ARB which decides which request can be processed depending on the state of all the requests that can be stored in the register sets RS1-RS4. One virtual processing unit does not therefore prevent the peripheral unit PRP from processing an access request sent by another virtual unit.

If the processing executed by the unit PRE produces or updates parameters intended for the unit CP1-CP4 having sent the processed request, such parameters can be stored in one of the register sets RS1-RS4. The unit ARB thus transfers the parameters to be stored into the register set selected upon the activation of the unit PRE. Upon completion of the processing performed by the unit PRE, the unit DSP may transmit all or part of the content of the selected register set to the virtual unit to which the register set has been allocated.

In one embodiment, the processing operations performed by the unit PRE are controlled by a finite state machine FSM. All the parameters defining a current state in the state machine FSM are stored in register sets allocated to each virtual unit CP1-CP4 identifier ID1-ID4, for example the register sets RS1-RS4. When a register set is selected to process an access request, the parameters stored in the selected register set are thus transferred to the state machine FSM to restore the state of the latter as it was at the end of the last processing operation performed for the virtual unit corresponding to the selected register set. The state machine FSM can then be activated to obtain parameters defining a next state of the state machine for the virtual unit corresponding to the selected register set. The parameters thus obtained are stored in the selected register set, so as to be possibly transmitted to the virtual unit and/or used to define a new current state of the state machine FSM when a new processing operation is applied to the selected register set, during which the state machine is activated.

A same state machine may thus be used to control several sequences of operations executed simultaneously by the unit PRE for several virtual units, without the risk of a virtual unit being able to affect the current state of the state machine stored for another virtual unit.

In the example of a peripheral unit of DMA control unit type, each register set RS1-RS4 may comprise a source address register for storing an address of a data block to be transferred, a destination address register for storing an address to which the data block is to be transferred, a length register for storing the length of the data block, and a validation register for indicating whether the source address, destination address and length registers specify a transfer to be performed, and thus whether the transfer can be performed. The validation register can be updated by the unit DSP to indicate that the request as it is stored in the register set is in a state of being processed. During or at the end of the execution of the request, the validation register is reset, for example by the unit ARB.

Figure 4:
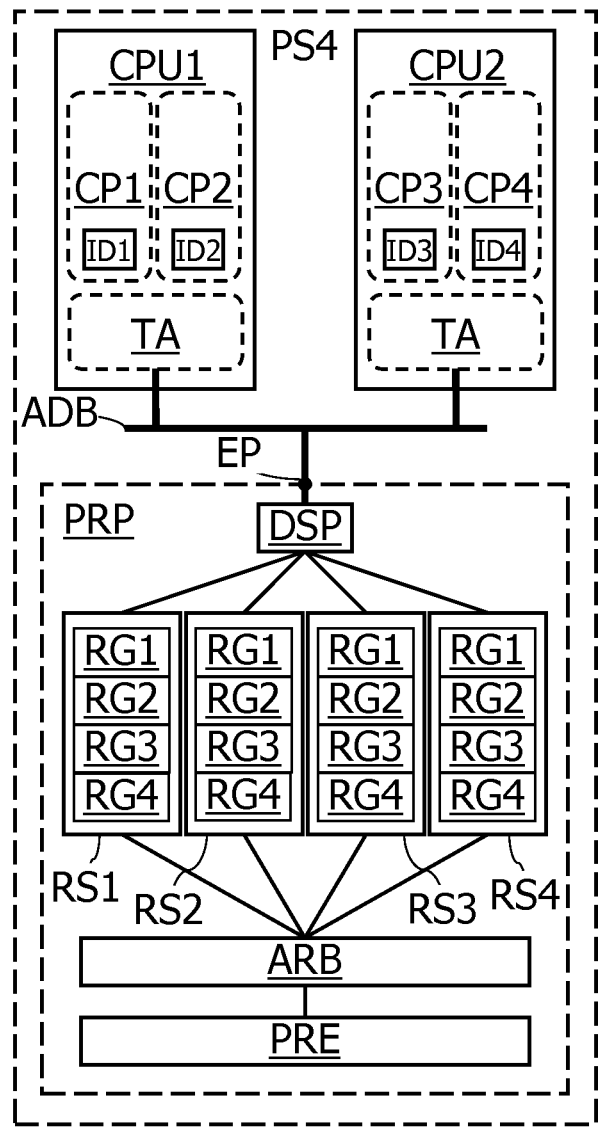
FIG. 4 schematically represents an architecture of a data processing system, according to another embodiment.

It shall be noted that the system may comprise several physical processing units each executing one or more virtual processing units. In that case, a distinct identifier is allocated to each virtual processing unit of the system. Thus, FIG. 4 represents a system PS4 according to one embodiment. The system PS4 differs from the system PS3 in that it comprises several physical processing units CPU1, CPU2 each executing virtual processing units CP1-CP4. In the example in FIG. 4, the unit CPU1 executes the virtual units CP1 and CP2, and the unit CPU2 executes the virtual units CP3 and CP4. The units CPU1, CPU2 are connected to the unique entry point EP of the peripheral unit PRP by means of an address and data bus ADB. The access of the units CP1-CP4 to the unit PRP is performed in the same way as in the system PS3. The requests sent by the virtual units CP1-CP4 are transmitted sequentially to the unit PRP by the bus ADB, and transferred as and when they are received by the unit DSP in the register sets RS1-RS4.

Figure 5:
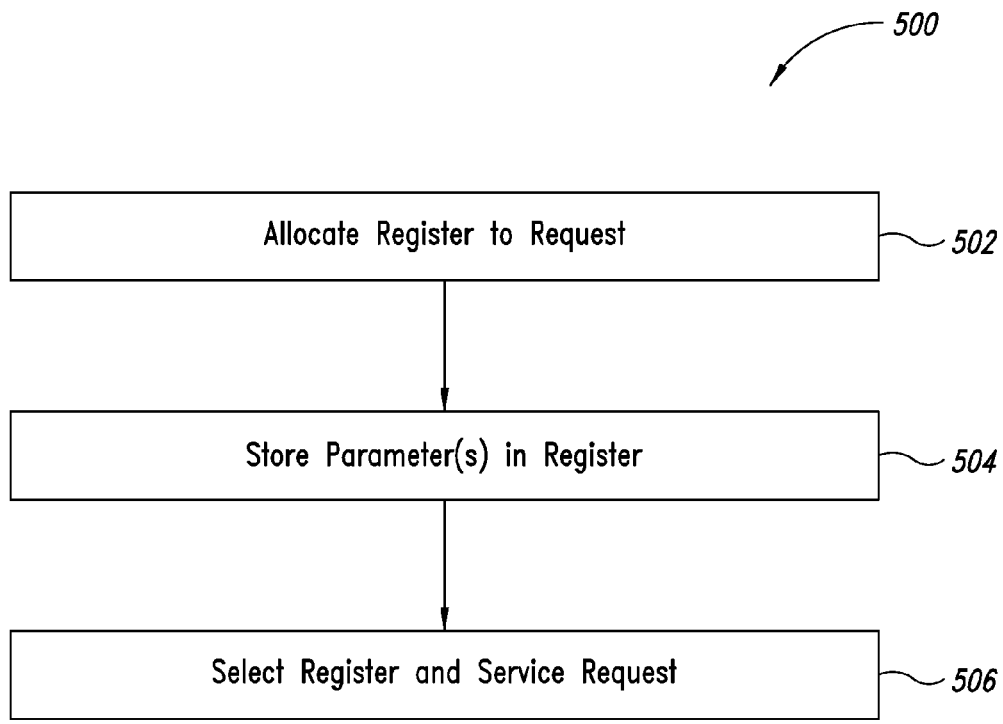
FIG. 5 illustrates a method of accessing a peripheral device according to an embodiment.

FIG. 5 illustrates an embodiment of a method 500 of enabling a virtual processing unit to access a peripheral unit, the virtual processing unit being implemented by a physical processing unit connected to the peripheral unit and capable of executing a plurality of virtual processing units. At 502 the peripheral unit allocates one or more registers to a received access request. At 504, the peripheral unit stores one or more parameters associated with the access request in the allocated one or more registers. At 506, the peripheral device selects an access request for servicing and services the request. The peripheral device may select an access request to be serviced by selecting registers. Servicing the request may comprise storing state machine parameters in one or more of the allocated registers.

Some embodiments may take the form of computer program products. For example, according to one embodiment there is provided a computer readable medium comprising a computer program adapted to perform one or more of the methods described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

For example, as shown in FIG. 6, a peripheral device 600 may comprise a processing unit 602. The processing unit 602 comprises a processor 604 and a memory 606. The peripheral device 600 includes data register sets RS1 to RSn 608, each of which may contain one or more registers (see FIG. 4 showing register sets which contain, for example, four registers each), an arbitrator 610, a switch module DSP 612, a finite state machine 614 and a peripheral service module 616. The memory 606 may store instructions, software modules and/or data structures for causing the processor to perform the methods discussed herein or the functions of the various modules, such as the functions of the data registers 608, the arbitrator 610, the switch module DSP 612, the finite state machine 614 and/or the peripheral service module 616. The disclosure also extends to a processor running the software or code, e.g. a computing system configured to carry out one or more of the methods described above. Furthermore, in some embodiments, some or all of the systems and/or modules may be implemented or provided in other manners, such as at least partially in firmware and/or hardware, including, but not limited to, one or more application-specific integrated circuits (ASICs), discrete circuitry, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology.

The systems, modules and data structures may also be transmitted as generated data signals (e.g., as part of a carrier wave) on a variety of computer-readable transmission mediums, including wireless-based and wired/cable-based mediums.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system comprising: a processing system configured to execute virtual processing sessions; and a peripheral unit including: a plurality of sets of data registers, each set having at least one data register, the peripheral unit being configured, in response to a service request received from a virtual processing session, to allocate at least one set of registers in the plurality of sets of registers to the received service request and to store at least one parameter and a session ID associated with the received service request in the at least one set of registers allocated to the received service request; an arbitrator configured to select a set of registers of the plurality of sets of registers; and a service module configured to service a service request to which the selected set of registers is allocated.

2. The system of claim 1 wherein the processing system comprises a plurality of physical processors each configured to execute a plurality of virtual processing sessions.

3. The system of claim 1 wherein the peripheral unit further comprises a finite state machine and the peripheral unit is configured to maintain in the set of registers allocated to the received service request a state of the finite state machine.

4. A peripheral unit, comprising: a plurality of sets of data registers, each set having at least one data register, the peripheral unit configured to respond to a service request received from a virtual processing session by allocating at least one set of registers in the plurality of sets of registers to the received service request and to store at least one parameter and a session ID associated with the received service request in the at least one set of registers allocated to the received service request; and at least one processor, wherein the at least one processor is configured to implement: an arbitrator configured to select a set of registers of the plurality of sets of registers; and a service module configured to service a service request to which the selected set of registers is allocated.

5. The peripheral unit of claim 4 wherein the service module comprises a finite state machine implemented by the at least one processor and the peripheral unit is configured to maintain in the at least one set of registers allocated to the received service request a state of the finite state machine.

6. The system of claim 1 wherein the peripheral unit comprises a finite state machine and is configured to:
store in the register set allocated to the received service request parameters defining a current state of the finite state machine;
load into the state machine the parameters defining a state machine current state stored in the allocated register set;
activate the state machine to determine parameters defining a next state of the state machine; and store the parameters obtained in the allocated register set so as to define a new current state of the state machine.

7. The system of claim 1 wherein the arbitrator is configured to select one of the sets of data registers from register sets meeting a condition for triggering a process in the peripheral unit.

8. The system of claim 1 wherein the service module is configured to store in the selected register set parameters generated during service of the service request.

9. The system of claim 8 wherein the peripheral unit is configured to transmit parameters stored in the selected register set to an executing virtual processing session.

10. The peripheral unit of claim 4 wherein the service module comprises a finite state machine implemented by the at least one processor and the peripheral unit is configured to maintain in the at least one set of registers allocated to the received service request a state of the finite state machine by storing in the at least one set of registers allocated to the received service request parameters defining a current state of the finite state machine;

loading into the state machine the parameters defining a state machine current state stored in the at least one set of registers;

activating the state machine to determine parameters defining a next state of the state machine; and storing the parameters obtained in the at least one set of registers so as to define a new current state of the state machine.

11. The peripheral unit of claim 4 wherein the arbitrator is configured to select one of the register sets from register sets meeting a condition for triggering a process in the peripheral unit.

12. The peripheral unit of claim 11 wherein the service module is configured to store in the selected register set parameters generated during executing of the process.

13. The peripheral unit of claim 4 wherein the peripheral unit is configured to transmit parameters stored in the selected register set to associated virtual processing sessions.

* * * * *